US007428226B2

(12) United States Patent
Adrangi et al.

(10) Patent No.: US 7,428,226 B2
(45) Date of Patent: Sep. 23, 2008

(54) METHOD, APPARATUS AND SYSTEM FOR A SECURE MOBILE IP-BASED ROAMING SOLUTION

(75) Inventors: Farid Adrangi, Lake Oswego, OR (US); Ranjit S. Narjala, Hillsboro, OR (US); Michael B. Andrews, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 10/323,486

(22) Filed: Dec. 18, 2002

(65) Prior Publication Data

US 2004/0120328 A1 Jun. 24, 2004

(51) Int. Cl.
*H04Q 7/24* (2006.01)
*H04L 12/28* (2006.01)

(52) U.S. Cl. ....................... 370/331; 370/338; 370/392; 370/401

(58) Field of Classification Search ....................... None
See application file for complete search history.

(56) References Cited

U.S. PATENT DOCUMENTS 6,452,920 B1 * 9/2002 Comstock .................. 370/349
6,496,704 B2 * 12/2002 Yuan .......................... 455/466
6,522,880 B1 * 2/2003 Verma et al. ................ 455/436
6,950,862 B1 * 9/2005 Puthiyandyil et al. ....... 709/220
2002/0018456 A1 * 2/2002 Kakemizu et al. ........... 370/338

* cited by examiner

*Primary Examiner*—Chau Nguyen
*Assistant Examiner*—Jordan Hamann
(74) *Attorney, Agent, or Firm*—Sharmini N. Green, Intel Corporation

(57) ABSTRACT

A method, apparatus and system provide a seamless, secure roaming solution. Embodiments of the present invention enable secure transmission of IP packets across enterprise security gateways. According to one embodiment, a mobile node on an external network may register with an external home agent using an external home address. The mobile node may also establish a secure path to the security gateway using the external home address and an internal home address. The mobile node may thereafter use the secure path to correspond with nodes on the external network. In other embodiments, the mobile node may use this secure path to register with an internal home agent on a home network, using the internal home address. The mobile node may then correspond with nodes on the home network via the secure path.

25 Claims, 6 Drawing Sheets

ESTABLISH IPSEC TUNNEL 315 & REGISTER (401-403)
SEND IP PACKET FROM MN 140 TO CN 310 (404-406)
SEND IP PACKET FROM CN 310 TO MN 140 (407-410)

METHOD, APPARATUS AND SYSTEM FOR A SECURE MOBILE IP-BASED ROAMING SOLUTION

FIELD OF THE INVENTION

The present invention relates to the field of mobile computing, and, more particularly to a seamless, secure roaming solution across enterprise firewalls.

BACKGROUND OF THE INVENTION

Use of mobile computing devices (hereafter "mobile nodes") such as laptops, notebook computers, personal digital assistants ("PDAs") and cellular telephones is becoming increasingly popular today. These mobile nodes enable users to move from one location to another ("roam"), while continuing to maintain their connectivity to the same network. Given its increasing popularity, it is unsurprising that most corporate ("enterprise") networks today attempt to facilitate fast and secure mobile computing.

In order to roam freely, networks today generally conform to mobile IP standards promulgated by the Internet Engineering Task Force ("IETF"). Mobile IPv4 (IETF RFC 3344, August 2002) is currently the predominant standard, and many networks today are Mobile IPv4 compliant. The standard, however, fails to provide solutions to obstacles that arise in certain roaming scenarios.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a seamless roaming solution across enterprise security mechanisms such as firewalls. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1:
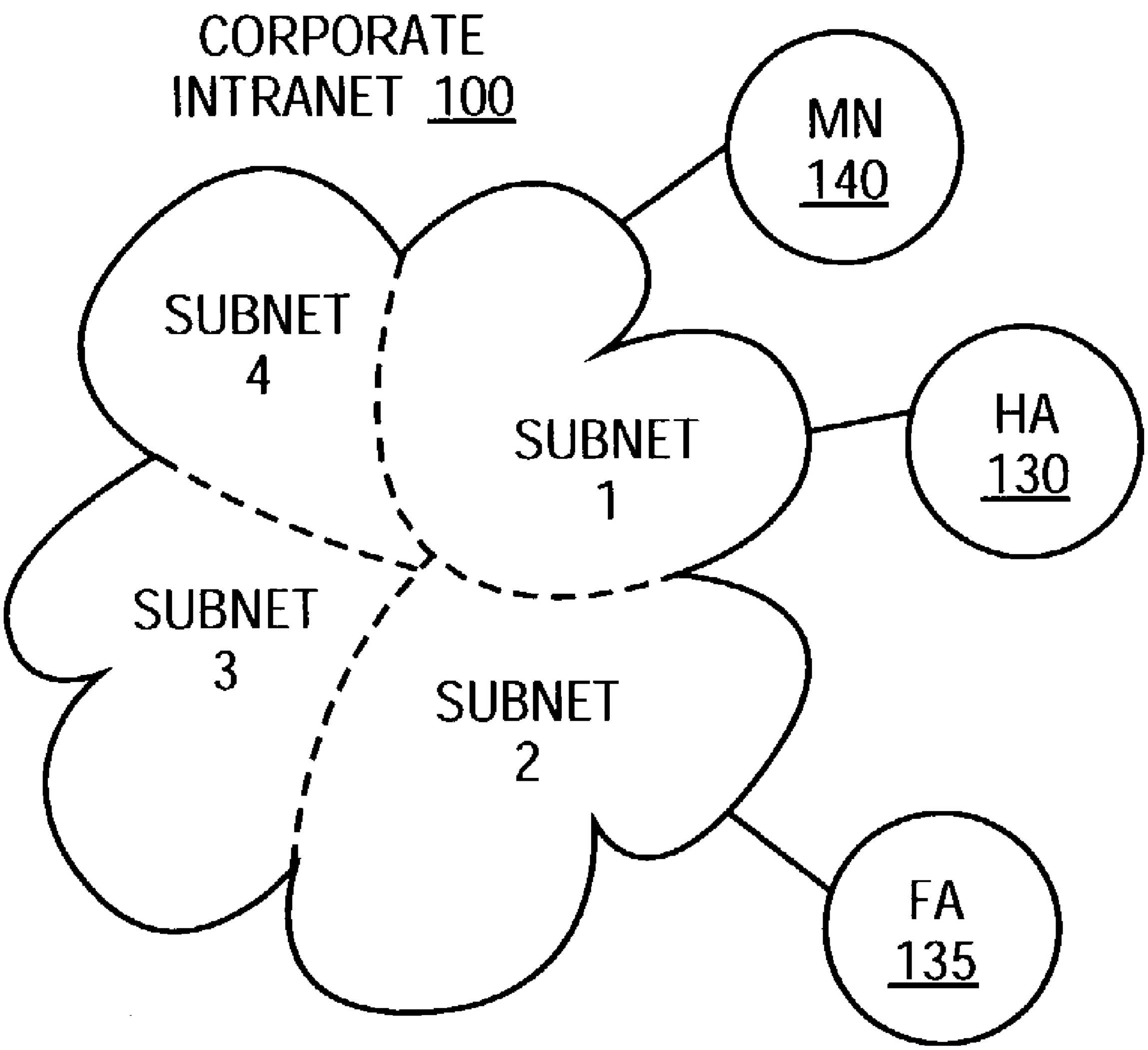
FIG. 1 illustrates a known corporate intranet structure.

FIG. 1 illustrates a known corporate intranet ("Corporate Intranet 100") structure. Corporate Intranet 100 may include both wired and wireless networks and may comprise multiple subnets. Subnets refer to portions of networks that may share the same common address format. For example, on a Transport Control Protocol/Internet Protocol ("TCP/IP") network, all subnets may use the same first three sets of numbers (such as 100.10.10). Mobile nodes that conform to Mobile IPv4 standards today may roam freely across subnets within Corporate Intranet 100. Thus, for example, when a mobile node ("MN 140") exits its home subnet, it may continue to maintain its current transport connections and constant reachability in one of two ways. In the first scenario, MN 140 may register with a home agent ("HA 130") when it exits its home subnet. During the registration process, MN 140 informs HA 130 of MN 140's "care-of address" (hereafter "COA"), namely MN 140's address on its new subnet. HA 130 thereafter intercepts all IP packets addressed to MN 140 and reroutes the packets to MN 140's COA. As MN 140 moves from one subnet to another, MN 140 may obtain new COAs via Dynamic Host Configuration Protocol ("DHCP") or other similar protocols. To ensure that HA 130 is able to properly route packets to MN 140, MN 140 must continuously update HA 130 with its new COA as it roams on Corporate Intranet 100. This configuration is commonly referred to as a "co-located" communications mode.

Alternatively, when MN 140 leaves its home subnet, it may register with HA 130 via a foreign agent ("FA 135") on MN 140's new ("foreign") subnet. By registering with FA 135, MN 140 may use FA 135's IP address as its COA when registering with HA 130. In this scenario, HA 130 continues to intercept all packets addressed to MN 140, but these packets are now rerouted to FA 135, namely MN 140's COA as provided to HA 130. FA 135 examines all packets it receives, and sends the appropriate ones to MN 140 at its current location on the foreign subnet. This configuration is commonly referred to as a "non co-located" communications mode. The decision of whether to use co-located or non co-located mode is well known to those of ordinary skill in the art. Certain networks may, for example, force MN 140 to register with FA 135 in order to maintain its transport connections. In other networks, MN 140 may have the option of registering with FA 135 or operating in a co-located mode.

Figure 2:
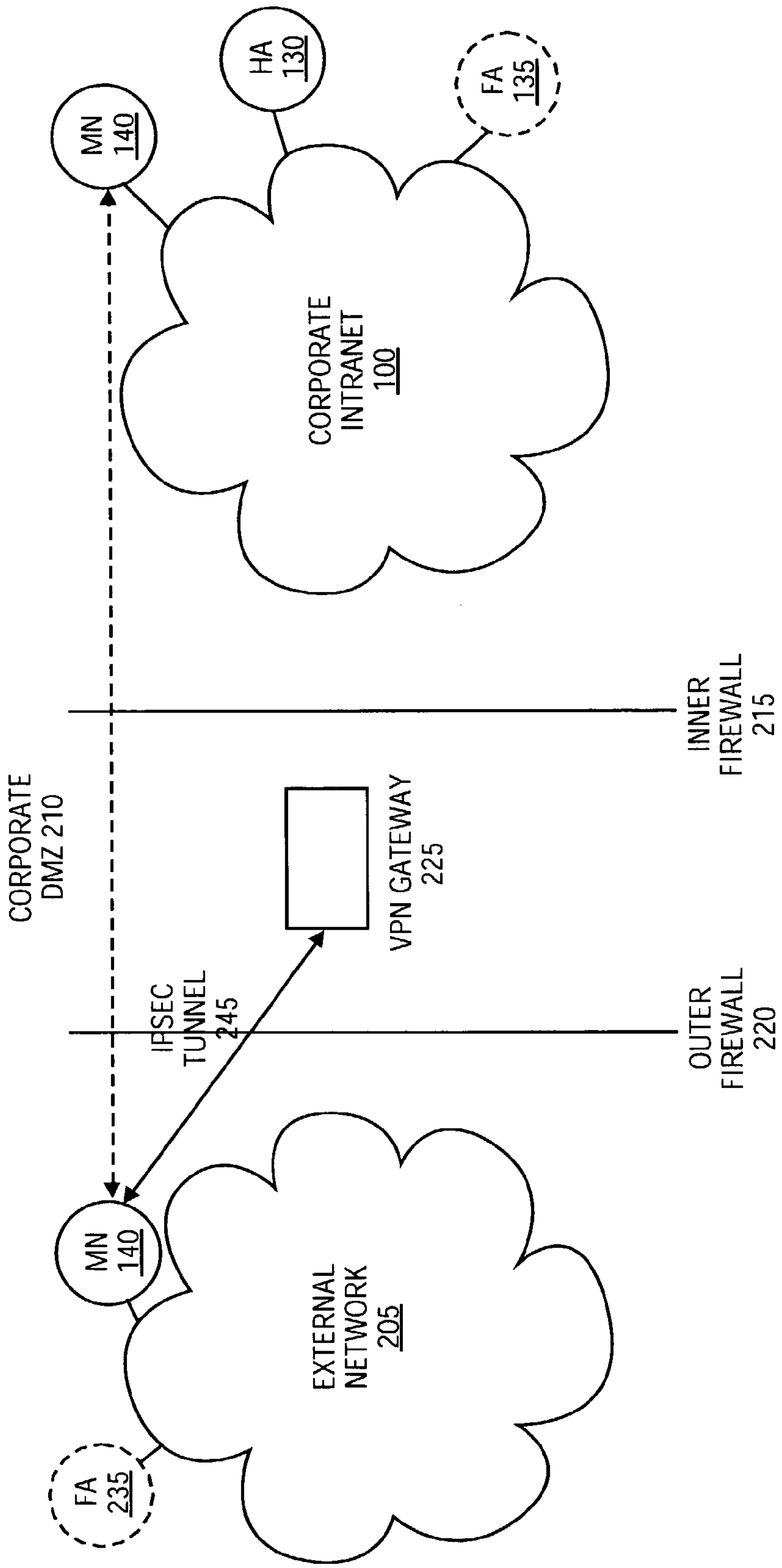
FIG. 2 illustrates a known enterprise network topology.

Corporate Intranet 100 may also be coupled to an external network, such as the Internet, and MN 140 may roam between Corporate Intranet 100 and the external network. FIG. 2 illustrates a known network topology today, comprising Corporate Intranet 100, separated from an external network ("External Network 205") by a corporate demilitarized zone 210 ("Corporate DMZ 210"). Corporate DMZ 210 is well known to those of ordinary skill in the art, and typically includes two firewalls: Inner Firewall 215 and Outer Firewall 220. Inner Firewall 215 separates Corporate Intranet 100 from Corporate DMZ 210 while Outer Firewall 220 separates External Network 205 from Corporate DMZ 210. Similar to Corporate Intranet 100, External Network 205 may also include both wired and wireless networks and comprise multiple subnets. The network topology may also include one or more foreign agents ("FA 235") on External Network 205, in addition to HA 130 and FA 135 on Corporate Intranet 100. FA 235 may be on a different administrative domain from (i.e., not managed by the same entity as) HA 130 and FA 135 on Corporate Intranet 100.

For security purposes, many network topologies are likely to include security gateways such as Virtual Private Network ("VPN") gateways (collectively illustrated in FIG. 1 as "VPN Gateway 225") that separate Corporate Intranet 100 from External Network 205. VPN Gateway 225 may be configured to provide a secure means of communication between nodes on Corporate Intranet 100 and nodes on External Network 205. VPN gateways are well known to those of ordinary skill in the art and further description thereof is omitted herein.

The presence of VPN Gateway 225 introduces a layer of complexity when MN 140 attempts to roam between Corporate Intranet 100 and External Network 205. More specifically, if VPN Gateway 225 exists between Corporate Intranet 100 and External Network 205, when MN 140 exits Corporate Intranet 100 to roam on External Network 205, MN 140 has to first establish a secure IP connection (illustrated conceptually as "IPSec Tunnel 245") with VPN Gateway 225 in order to maintain its current transport connections. IPSec Tunnel 245 between MN 140 and VPN Gateway 225 is associated with two tunnel IP addresses. The two addresses correspond to Tunnel Outer Address ("TOA"), namely the address of MN 140 on External Network 205, External Networkand Tunnel Inner Address ("TIA"), the address that is assigned to MN 140, which is logically on a subnet inside Corporate Intranet 100. In the example above, IPSec Tunnel 225's TOA corresponds to MN 140's COA. Use of IPSec tunnels with VPN gateways are well known to those of ordinary skill in the art and further descriptions of such are omitted herein.

Once IPSec Tunnel 245 is established between MN 140 and VPN Gateway 225, if MN 140 roams on External Network 205, MN 140 must continuously update HA 130 via IPSec Tunnel 145 with its new COA. As described above, however, IPSec Tunnel 145's TOA corresponds to MN 140's COA. Thus, in co-located mode, as MN 140 changes its current point of network attachment and its COA changes, MN 140 will have to renegotiate a new IPSec tunnel with VPN Gateway 225 with its new COA as the new IPSec tunnel's TOA. This renegotiation process has significant performance implications and may cause packet flows to timeout prior to successful renegotiation.

In non co-located mode, MN 140's COA may also continuously change as it roams on External Network 205. Each time MN 140 moves from one subnet to another on External Network 205, it may register with a different foreign agent on each respective subnets. Each time MN 140 registers with a different foreign agent, MN 140's COA may change since MN 140 uses the foreign agent's address as its COA. In this configuration, however, the presence of VPN Gateway 225, and by extension, the use of IPSec Tunnel 145, preclude FA 235 (which is likely to be in a different administrative domain from HA 130 and any other foreign agents on External Network 205 from being able to view the contents of the IP packets it receives from MN 140 and HA 130. In other words, FA 235 will not be able to decrypt the IP packets between MN 140 and HA 130. Consequently, FA 235 may not be not able to deliver the packets to and from MN 140 and/or HA 130.

Embodiments of the present invention resolve difficulties arising from mobile nodes attempting to securely roam across enterprise DMZs that include VPN gateways. In co-located modes (where mobile nodes obtain COAs via DHCP or other similar protocols), embodiments of the present invention improve performance by addressing the problem described above, namely that mobile nodes have to renegotiate IPSec tunnels with VPN gateways each time they move from one subnet to another on the foreign networks. In non co-located modes (where mobile nodes register with foreign agents and use the foreign agent's IP address as their COA), embodiments of the present invention enable mobile nodes to communicate across VPN Gateways via IPSec tunnels, while maintaining their transport connections.

Figure 3:
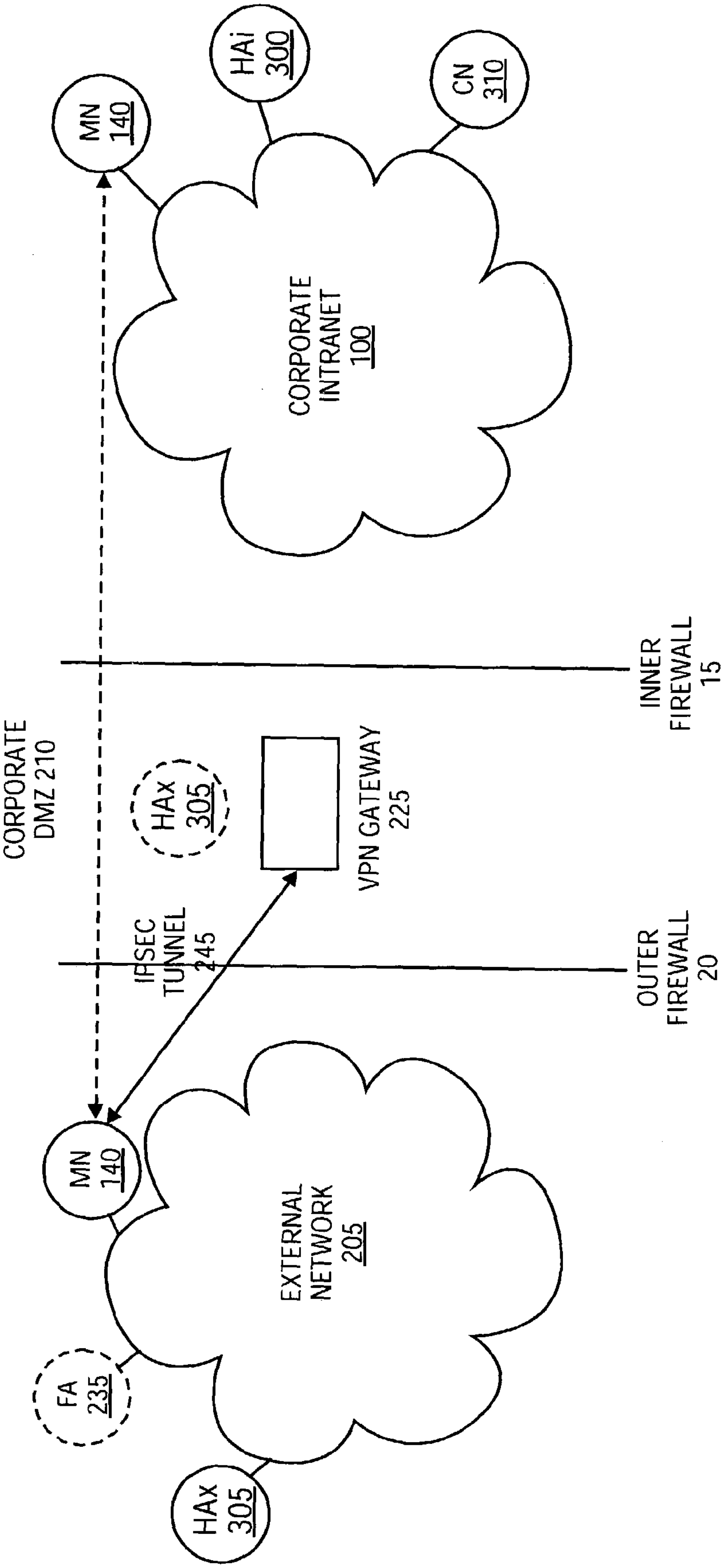
FIG. 3 illustrates a network topology according to an embodiment of the present invention.

FIG. 3 illustrates a network topology according to one embodiment of the present invention. Specifically, as illustrated, the network topology may include at least two home agents, one (or more) located on Corporate Intranet 100 ("HAi 300") and the other located external to Corporate Intranet 100 ("HAx 305"). "External" to Corporate Intranet 100 may include locations within Corporate IDMZ 210 or on External Network 205. For the purposes of explanation, the following description assumes that HAx 305 is located on External Network 205, but embodiments of the present invention are not so limited. HAx 305 may, for example, be located within Corporate DMZ 210. Additionally, HAx 305 may, in some embodiments, be implemented on an independent data processing device within Corporate DMZ 210. HAx 305 may also, in other embodiments, be implemented on the same data processing device(s) as VPN Gateway 225. It will be apparent to those of ordinary skill in the art that HAx 305 may be implemented in numerous ways without affecting the spirit of embodiments of the present invention.

Embodiments of the present invention are described in conformance with the Mobile IPv4 standard (IETF RFC 3344, August 2002). It will be readily apparent to those of ordinary skill in the art, however, that embodiments of the present invention may be implemented on networks confirming to other roaming standards. Networks may be compliant with Mobile IPv6 (IETF Mobile IPv6, Internet Draft draft-ietf-mobileip-ipv6-19.txt. (Work In Progress), October 2002), for example, but due to the current nature of such networks, the above-described problems are unlikely to arise. It will be readily apparent to those of ordinary skill in the art, however, that in the event such problems do arise within Mobile IPv6 or other similar networks, embodiments of the present invention may easily be modified for use on such networks.

According to embodiments of the present invention, MN 140 may include, but is not limited to, laptops, notebook computers, handheld computing devices, personal digital assistants (PDAs), cellular telephones, and other such devices capable of wireless access. The following represent typical roaming scenarios for MN 140. First, as described with respect to FIG. 1 above, MN 140 may roam from its home subnet to other subnets within Corporate Intranet 100. Roaming within Corporate Intranet 100 remains unaffected by embodiments of the present invention because no VPN gateways and/or IPSec-protected IP packets are implicated. The other roaming scenarios include roaming from Corporate Intranet 100 to External Network 205, roaming from External Network 205 to Corporate Intranet 100, and/or roaming on External Network 205. Embodiments of the present invention may be implicated in these latter three roaming scenarios.

In one embodiment, MN 140 may roam from a subnet within Corporate Intranet 100, across Corporate DMZ 210, to a subnet on External Network 205. In this scenario, in order to communicate (or maintain existing communications) with nodes such as Correspondent Node ("CN") 310 on Corporate Intranet 100, according to an embodiment of the invention, MN 140 registers with HAi 300 and HAx 305. More specifically, MN 140 first registers with HAx 305 and obtains its home address on HAx 305 ("MN_Hx") and its care-of address on External Network 205 (hereafter "COAx"), which may be obtained via a DHCP server and/or other similar means. The DHCP server may, for example, be owned by a service provider on External Network 205. In other embodiments, MN 140 may obtain COAx from Foreign Agent 235.

MN 140 then establishes IPSec Tunnel 315 to VPN Gateway 225. Once again, IPSec Tunnel 315 between MN 140 and VPN Gateway 225 is associated with two tunnel addresses, TOA and TIA. According to embodiments of the present invention, prior to or during the process of negotiating with VPN Gateway 225 to establish IPSec Tunnel 315, MN 140 and/or VPN Gateway 225 may assign MN_Hx as the TOA, and MN 140's home address on HAi ("MN_Hi") as the TIA.

It will be readily apparent to those of ordinary skill in the art that the process of assigning MN_Hx and MN_Hi to TOA and TIA respectively may be performed in a number of ways. MN_Hi is an invariant address assigned either statically or dynamically to MN 140. MN_Hi may, for example, be manually associated with MN 140 by a corporate Information Technology department or other such entity. Alternatively, the address may be assigned dynamically through a registration request from MN 140, combined with a Network Address Identifier ("NAI") extension. Other similar methodologies may be employed in various embodiments. The previous description assumes that MN 140 is aware of its invariant home address prior to roaming outside Corporate Intranet 100. If, however, MN 140 does not initially know its home address when it roams from Corporate Intranet 100 to External Network 205, MN 140 may have to perform additional steps described in detail later in this specification.

Once IPSec Tunnel 315 is established, MN 140 may register (via IPSec Tunnel 315) with HAi 300 and provide HAi 300 with its home address (MN_Hi) and a care-of address with respect to HAi 300 ("COAi"). In one embodiment, COAi is VPN Gateway 225's private IP address. Thereafter, MN 140 may apply IPSec security protocols to all IP packets it transmits, and send these packets securely to nodes on Corporate Intranet 100 via IPSec Tunnel 315 and vice versa. IPSec security protocols may include the IP Authentication Header ("AH") protocol and the Encapsulating Security Payload ("ESP") protocol. AH may provide connectionless integrity, data origin authentication and optional anti-replay services while ESP may provide encryption, limited traffic flow confidentiality, connectionless integrity, data origin authentication and anti-replay services. For the purposes of this specification, references to "encryption" and/or variations thereof generally refer to applying AH and/or ESP to IP packets, and references to "IPSec-protected IP packets" refers to IP packets that are encrypted. The mechanisms to perform such encryption are known to those of ordinary skill in the art and description of such is therefore omitted herein in order not to unnecessarily obscure embodiments of the present invention.

Figure 4:
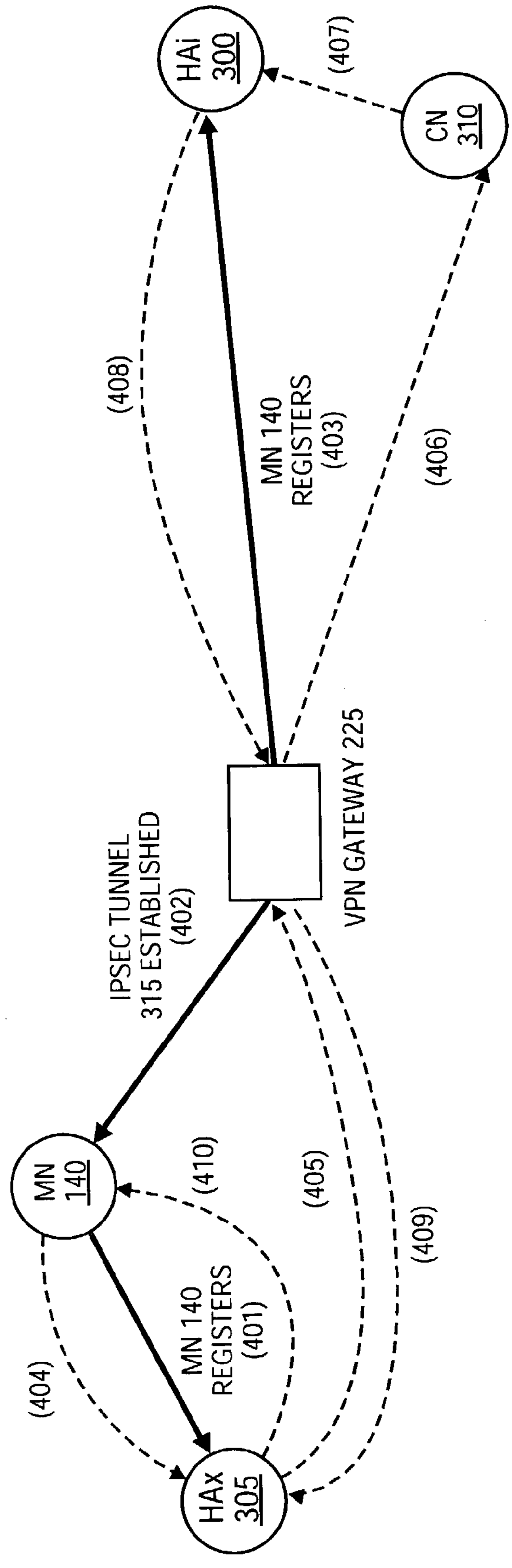
FIG. 4 illustrates conceptually the process of establishing an IPSec tunnel and transferring IP packets via the IPSec tunnel, between a mobile node on a foreign network and a correspondent node on a corporate intranet.

FIG. 4 illustrates conceptually the process described above according to one embodiment of the present invention. Although the following description assumes that the processes occur sequentially, embodiments of the present invention are not so limited. Certain processes may occur sequentially while others may occur simultaneously without departing from the spirit of embodiments of the present invention. As illustrated, in 401, MN 140 registers with HAx 305. MN 140 also establishes, in 402, an IPSec tunnel with VPN Gateway 225. The IPSec tunnel comprises TOA and TIA corresponding to MN_Hx and MN_Hi respectively. MN 140 then registers with HAi 300 via the IPSec tunnel in 403, and provides HAi 300 with its care-of address (COAi, namely VPN Gateway 225's private address). MN 140 may then securely transmit IPSec-protected IP packets to nodes such as CN 310 on Corporate Intranet 100.

Once MN 140 is registered with HAx and HAi, and IPSec Tunnel 315 has been established, MN 140 may send and receive IPSec-protected IP packets to and from CN 310. As illustrated conceptually in FIG. 4, MN 140 may send an IPSec-protected IP packet to CN 310 as follows. The IP packet from MN 140 is encrypted and "reverse tunneled" to HAx 305 in 404. The process of reverse tunneling essentially encapsulates the IPSec-protected IP packet with an IP header identifying MN 140's COAx as the source address and HAx 305 as the destination node. HAx 305 receives and decapsulates the packet and transmits it to VPN Gateway 225 in 405. VPN Gateway 225 receives the packet and decrypts it to identify the ultimate destination node, namely CN 310. VPN Gateway 225 then sends the decrypted packet to CN 310 in 406, using MN_Hi as the address for the source node and CN 310 as the destination node address.

Figure 5:
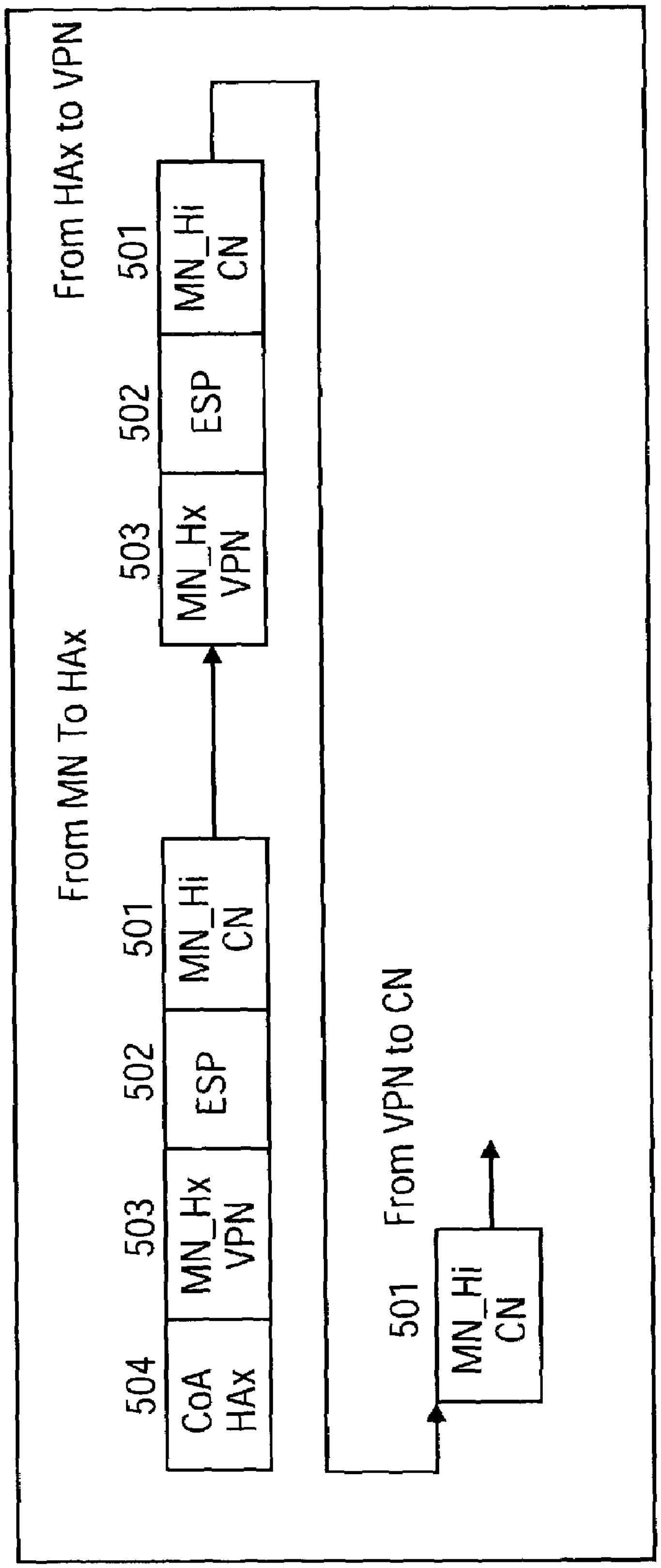
FIG. 5 illustrates a packet flow diagram of an IP packet sent from a mobile node (MN) on a foreign network to a correspondent node (CN) within an intranet.

In an embodiment, CN 310 may respond to the IP packet by sending out a responsive IP packet to MN 140. In an alternate embodiment, CN 310 may initiate correspondence with MN 140. In either instance, since MN 140 is registered with HAi 300, any packets from CN 310 may be intercepted by HAi 300 in 407. HAi 300 examines the packet and sends the packet to COAi (i.e., VPN Gateway 225's private address which is MN 140's care-of address with respect to HAi 300) in 408. VPN Gateway 225 receives the encrypted IP packet, removes the outer IP encapsulation and examines the packet to determine the address of the destination node, in this case MN 140. Upon identifying MN 140 as the destination node, VPN Gateway 225 encrypts the packet and sends the packet to MN_Hx. Since MN 140 is registered with HAx 305 on External Network 205, HAx 305 intercepts that packet in 409. HAx 305 examines the IP packet, identifies MN 140 as the destination node, and in 410, HAx 305 routes the packet to MN 140's COAx (i.e., MN 140's current subnet location on External Network 205). FIG. 5 is a packet flow diagram, conceptually illustrating the above-described packet transmission from MN 140 on External Network 205 to CN 310 on Corporate Intranet 100. Specifically, as illustrated, IP packet 501 from MN 140 is addressed from MN_Hi (MN 140's invariant home address as registered with HAi) to CN 310. This packet is encrypted (add 502), addressed to VPN Gateway 225 (add 503) and reverse tunneled to HAx 305 (add 504), using MN 140's COAx as the source IP address in the outer IP header. HAx 305 receives the packets, decapsulates it (removes 504), identifies VPN Gateway 225 as the destination and sends the packet to VPN Gateway 225. VPN Gateway 225 receives the packet (removes 503), decrypts it (removes 502), identifies in the original packet 501 the destination node CN 310, and sends the packet to CN 310.

Figure 6:
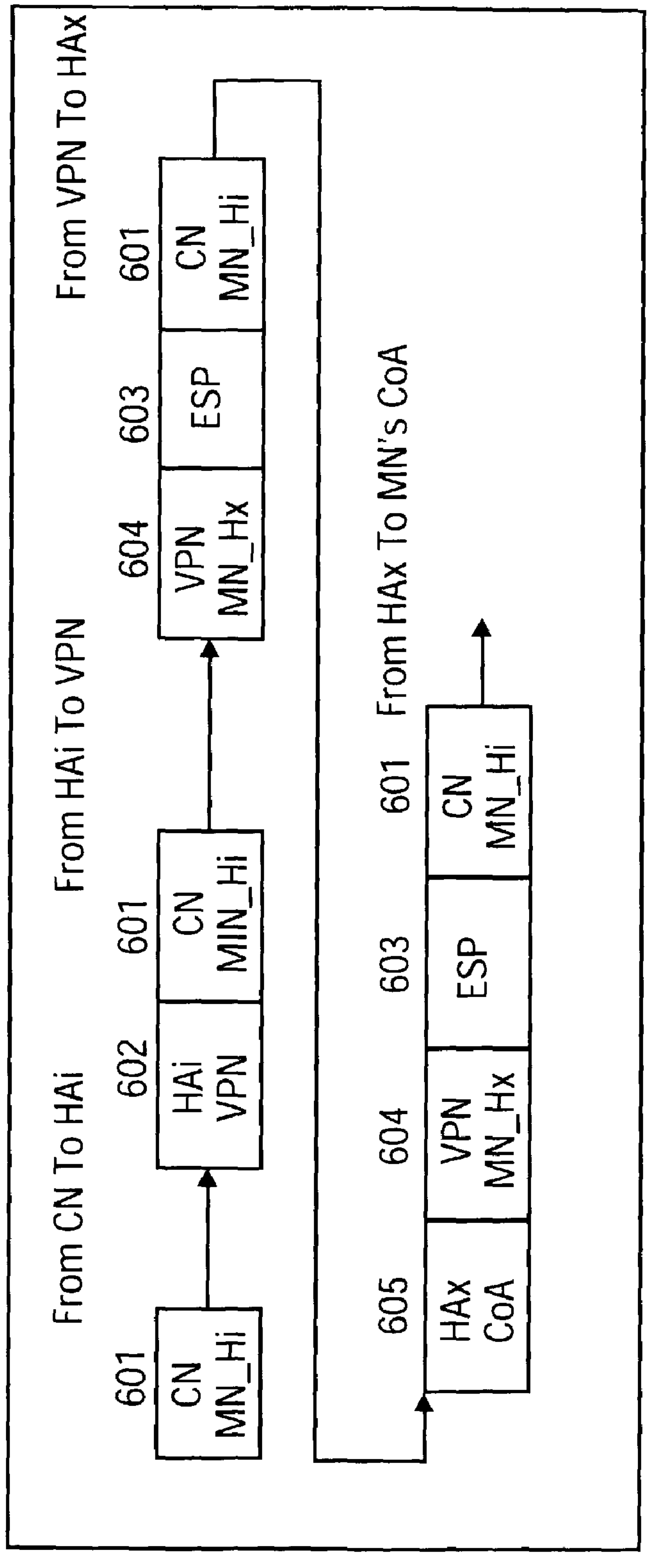
FIG. 6 illustrates a packet flow diagram of an IP packet sent from a correspondent node (CN) within an intranet to a mobile node (MN) on a foreign network.

FIG. 6 is a packet flow diagram, conceptually illustrating the above-described packet transmission from CN 310 on Corporate Intranet 100 to MN 140 on External Network 205. An IP packet 601 from CN 310 to MN 140 may be intercepted by HAi 300 (since MN 140 is registered with HAi 300). HAi 300 may then forward the packet to MN 140's VPN Gateway 225 (add 602). VPN Gateway 225, in turn, receives the packet (removes 602), encrypts the packet (adds 603) and sends the packet to MN_Hx (adds 604). HAx 305 intercepts the packet, identifies MN 140 as the ultimate destination node, and sends the packet (adds 605) to MN 140's COAx, i.e., its current subnet location on External Network 205.

As described above, the previous descriptions assume that MN 140 knows its home address when it initially exits Corporate Intranet 100. In the event MN 140 is not yet aware of its home address and/or has not yet been assigned a home address when it exits Corporate Intranet 100 onto External Network 205, the embodiments of the invention may still be applied. In this situation, however, MN 140 may initially register with HAx 305, establish a temporary IPSec tunnel ("IPSec Temp") with VPN gateway 225, and register with HAi 235. When registering with HAi 235, MN 140 may leave the "home address" field empty, thus allowing HAi to assign a home address to MN 140. Once MN 140 receives this assigned home address, it may then tear down IPSec Tunnel Temp and establish IPSec Tunnel 315 using the recently assigned invariant home address as the TIA. Thereafter, embodiments of the invention may be applied as described above.

According to embodiments of the present invention, when MN 140 roams from External Network 205 back to Corporate Intranet 100, MN 140 may remain registered with HAi 300. MN 140 may, however, tear down IPSec Tunnel 315. For the purposes of this application, "tear down" includes removing associations between MN 140, HAx 305, TIA and TOA. MN 140 may then continue to roam within Corporate Intranet 100 while maintaining its transport connections.

If MN Mobile Node 140 exits Corporate Intranet 100, intending to roam solely on External Network 205, i.e. it does not intend to communicate with any nodes on Corporate Network 100, MN 140 may simply register with HAx 305 and establish IPSec Tunnel 315 with VPN Gateway 225. MN 140 does not, in this scenario, have to register with HAi 300 because HAi 300 only routes packets within Corporate Network 100. By establishing IPSec Tunnel 315 with VPN Gateway 225, however, MN 140 may maintain its transport connections on Corporate Network 100 and communicate securely with other nodes on External Network 205.

The mobile nodes, home agents and VPNs according to embodiments of the present invention may be implemented on a variety of data processing devices. It will be readily apparent to those of ordinary skill in the art that these data processing devices may include various software, and may comprise any devices capable of supporting mobile networks, including but not limited to mainframes, workstations, personal computers, laptops, portable handheld computers, PDAs and/or cellular telephones. In an embodiment, mobile nodes may comprise portable data processing systems such as laptops, handheld computing devices, personal digital assistants and/or cellular telephones. According to one embodiment, home agents and/or VPNs may comprise data processing devices such as personal computers, workstations and/or mainframe computers. In alternate embodiments, home agents and VPNs may also comprise portable data processing systems similar to those used to implement mobile nodes.

According to embodiment of the present invention, data processing devices may include various components capable of executing instructions to accomplish an embodiment of the present invention. For example, the data processing devices may include and/or be coupled to at least one machine-accessible medium. As used in this specification, a "machine" includes, but is not limited to, any data processing device with one or more processors. As used in this specification, a machine-accessible medium includes any mechanism that stores and/or transmits information in any form accessible by a data processing device, the machine-accessible medium including but not limited to, recordable/non-recordable media (such as read only memory (ROM), random access memory (RAM), magnetic disk storage media, optical storage media and flash memory devices), as well as electrical, optical, acoustical or other form of propagated signals (such as carrier waves, infrared signals and digital signals).

According to an embodiment, a data processing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. A host bus host controller such as a Universal Serial Bus ("USB") host controller may be coupled to the bus(es) and a plurality of devices may be coupled to the USB. For example, user input devices such as a keyboard and mouse may be included in the data processing device for providing input data.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for securely transmitting network packets, comprising:

registering a mobile node with an external home agent using an external home address;

establishing an IPSec tunnel between the mobile node and a security gateway separating a home network from an external network, the IPSec tunnel comprising a tunnel outer address (TOA) corresponding to the external home address and a tunnel inner address (TIA) corresponding to an internal home address; and transmitting packets between the mobile node and a correspondent node via the IPSec tunnel.

2. The method according to claim 1 wherein the mobile node and the correspondent node are on the external network.

3. The method according to claim 1 wherein the mobile node is on the external network and the correspondent node is on the home network and the method further comprises registering the mobile node with an internal home agent on the home network via the IPSec tunnel using the internal home address.

4. The method according to claim 3 wherein registering the mobile node with the internal home agent further comprises registering the mobile node with the internal home agent using the internal home address and an internal care-of address.

5. The method according to claim 1 wherein registering the mobile node with the external home agent further comprises registering the mobile node with the external home agent using the external home address and an external care-of address.

6. The method according to claim 1 wherein the external home agent is on the external network.

7. The method according to claim 1 wherein the external home agent is within a corporate demilitarized zone separating the home network from the external network.

8. The method according to claim 7 wherein the security gateway is within the corporate demilitarized zone.

9. A method for routing packets across a security gateway, comprising:

receiving a request from a mobile node to establish an IPSec tunnel;

establishing an IPSec tunnel comprising a tunnel outer address (TOA) corresponding to an external home address of the mobile node and a tunnel inner address (TIA) corresponding to an internal home address of the mobile node; and routing packets between the mobile node and a correspondent node via the IPSec tunnel.

10. The method according to claim 9 wherein the security gateway separates a home network from an external network.

11. The method according to claim 9 wherein the mobile node is on the external network and the method further comprises registering the mobile node on an external home agent on the foreign network using the external home address.

12. The method according to claim 10 wherein the correspondent node is on the home network and the method further comprises registering the mobile node on an internal home agent on the home network via the IPSec tunnel using the internal home address.

13. The method according to claim 9 wherein receiving the request to establish the IPSec tunnel further comprises receiving the request to establish the IPSec tunnel using the external home address of the mobile node as the TOA and the internal home address of the mobile node as the TIA.

14. A system for securely transmitting network packets, comprising:

a security gateway separating a home network from an external network;

a mobile node capable of roaming between the home network and the external network;

an external home agent capable of registering an external home address for the mobile node when the mobile node is on the external network, the external home agent further capable of establishing a secure tunnel between the external home agent and the security gateway wherein the secure tunnel comprises the external home address and an internal home address; and a correspondent node capable of receiving communications from the mobile node via the secure tunnel.

15. The system according to claim 14 wherein the security gateway is a Virtual Private Network ("VPN") gateway.

16. The system according to claim 14 wherein the mobile node and the correspondent node are on the external network.

17. The system according to claim 14 wherein the mobile node is on the external network and the correspondent node is on the home network and the system further comprises an internal home agent capable of registering the internal home address for the mobile node when the mobile node is on the home network.

18. An article comprising a machine-accessible medium having stored thereon instructions that, when executed by a machine, cause the machine to:

register a mobile node with an external home agent using an external home address;

establish an IPSec tunnel between the mobile node and a security gateway separating a home network from an external network, the IPSec tunnel comprising a tunnel outer address (TOA) corresponding to the external home address and a tunnel inner address (TIA) corresponding to an internal home address; and transmit packets between the mobile node and a correspondent node via the IPSec tunnel.

19. The article according to claim 18 wherein the mobile node is on the external network and the correspondent node is on the home network and the article further comprises instructions that, when executed by a machine, further cause the machine to register the mobile node with an internal home agent on the home network via the IPSec tunnel using the internal home address.

20. The article according to claim 18 further comprising instructions that, when executed by a machine, further cause the machine to register the mobile node with the internal home agent using the internal home address and an internal care-of address.

21. The article according to claim 18 further comprising instructions that, when executed by a machine, further cause the machine to register the mobile node with the external home agent using the external home address and an external care-of address.

22. An article comprising a machine-accessible medium having stored thereon instructions that, when executed by a machine, cause the machine to:

receive a request from a mobile node to establish an IPSec tunnel;

establish an IPSec tunnel comprising a tunnel outer address (TOA) corresponding to an external home address of the mobile node and a tunnel inner address (TIA) corresponding to an internal home address of the mobile node; and route packets between the mobile node and a correspondent node via the IPSec tunnel.

23. The article according to claim 22 further comprising instructions that, when executed by a machine, further cause the machine to register the mobile node on an external home agent on the foreign network using the external home address.

24. The article according to claim 22 further comprising instructions that, when executed by a machine, further cause the machine to register the mobile node on an internal home agent on the home network via the IPSec tunnel using the internal home address.

25. The article according to claim 18 further comprising instructions that, when executed by a machine, further cause the machine to receive the request to establish the IPSec tunnel using the external home address of the mobile node as the TOA and the internal home address of the mobile node as the TIA.

* * * * *